(12) United States Patent
Oktay et al.

(10) Patent No.: US 12,243,096 B2
(45) Date of Patent: Mar. 4, 2025

(54) SYSTEM AND METHOD FOR A RAN EXCHANGE

(71) Applicant: Netsia, Inc., Santa Clara, CA (US)

(72) Inventors: Oguz Oktay, Sunnyvale, CA (US); Bulent Kaytaz, Istanbul (TR); Seyhan Civanlar, Istanbul (TR)

(73) Assignee: Netsia, Inc., Santa Clara, CA (US)

( * ) Notice: Subject to any disclaimer, the term of this patent is extended or adjusted under 35 U.S.C. 154(b) by 0 days.

(21) Appl. No.: 18/161,382

(22) Filed: Jan. 30, 2023

(65) Prior Publication Data

US 2023/0177599 A1 Jun. 8, 2023

Related U.S. Application Data

(63) Continuation of application No. 17/301,369, filed on Mar. 31, 2021, now Pat. No. 11,568,477, which is a (Continued)

(51) Int. Cl.
*H04W 28/20* (2009.01)
*G06Q 30/0645* (2023.01)
(Continued)

(52) U.S. Cl.
CPC ......... *G06Q 30/0645* (2013.01); *G06Q 30/08* (2013.01); *H04W 16/06* (2013.01);
(Continued)

(58) Field of Classification Search
CPC ....... H04W 16/14; H04W 4/90; H04W 24/00; H04W 72/00; H04W 24/02; H04W 88/08;
(Continued)

(56) References Cited

U.S. PATENT DOCUMENTS 9,516,549 B1   12/2016   Aksu
9,680,958 B2    6/2017   Sunay
              (Continued)

FOREIGN PATENT DOCUMENTS

EP     1853077 A1    11/2007
EP     2477427 A1     7/2012
WO  2014160106 A1    10/2014

OTHER PUBLICATIONS

International Preliminary Report on Patentability dated Aug. 18, 2020 received in counterpart International Application No. PCT/IB2019/051233, 11 pp.
(Continued)

*Primary Examiner* — Ronald Eisner
(74) *Attorney, Agent, or Firm* — Shumaker & Sieffert, P.A.

(57) ABSTRACT

Using a Radio Access Network (RAN) capacity exchange (or RANxChange), mobile operators can advertise slices/partitions of available unused base station capacity, and auction and lease it. A member-operator can advertise their unused base station capacity availability or lease capacity from another member-operator for a specific time period. The bidding operators can bid for the full auctioned capacity or portion of the auctioned capacity. The users start attaching the leased slice transparently without any configuration changes on their mobile devices.

20 Claims, 6 Drawing Sheets

Related U.S. Application Data continuation of application No. 15/898,401, filed on Feb. 16, 2018, now Pat. No. 10,997,653.

(51) Int. Cl.
*G06Q 30/08* (2012.01)
*H04W 16/06* (2009.01)
*H04W 72/0453* (2023.01)
*H04W 16/14* (2009.01)

(52) U.S. Cl.
CPC ....... *H04W 28/20* (2013.01); *H04W 72/0453* (2013.01); *H04W 16/14* (2013.01)

(58) Field of Classification Search
CPC ..... H04W 16/02–16; H04W 28/18–26; H04W 72/04–0453; G06Q 30/08; G06Q 30/0645
See application file for complete search history.

(56) References Cited

U.S. PATENT DOCUMENTS

| | | | |
|---|---|---|---|
| 2004/0105429 A1 | 6/2004 | Anckar et al. | |
| 2004/0185884 A1 | 9/2004 | Marin et al. | |
| 2004/0219912 A1 | 11/2004 | Johansson et al. | |
| 2005/0216758 A1 | 9/2005 | Matusz et al. | |
| 2008/0189192 A1 | 8/2008 | Ronen et al. | |
| 2008/0298284 A1 | 12/2008 | Dawson et al. | |
| 2011/0125905 A1 | 5/2011 | Baucke et al. | |
| 2013/0303114 A1 | 11/2013 | Ahmad et al. | |
| 2014/0019284 A1 | 1/2014 | Scherzer | |
| 2014/0029529 A1 | 1/2014 | Gogic et al. | |
| 2014/0359092 A1 | 12/2014 | Middleton et al. | |
| 2015/0358829 A1* | 12/2015 | Arnott | H04W 16/14 455/454 |
| 2016/0092321 A1 | 3/2016 | Okamura et al. | |
| 2016/0197781 A1* | 7/2016 | Smith | H04L 27/0006 370/254 |
| 2016/0212653 A1 | 7/2016 | Wang et al. | |
| 2017/0064653 A1 | 3/2017 | Griffioen | |
| 2017/0318468 A1* | 11/2017 | Aijaz | H04W 16/10 |
| 2017/0332295 A1* | 11/2017 | Sunay | H04W 8/22 |
| 2018/0206125 A1* | 7/2018 | Maguire | H04W 24/02 |
| 2018/0220277 A1* | 8/2018 | Senarath | H04M 15/8027 |
| 2018/0227768 A1 | 8/2018 | Samdanis et al. | |
| 2019/0045370 A1 | 2/2019 | Al-Fanek et al. | |
| 2019/0174498 A1* | 6/2019 | Samdanis | H04W 16/10 |
| 2019/0349838 A1* | 11/2019 | Futaki | H04W 74/002 |
| 2020/0107246 A1* | 4/2020 | Henttonen | H04W 48/12 |
| 2021/0377948 A1 | 12/2021 | Bedekar et al. | |

OTHER PUBLICATIONS

Prosecution History for U.S. Appl. No. 15/898,401, dated Jan. 16, 2020 to Feb. 23, 2021, 134 pp.

Prosecution History from U.S. Appl. No. 17/301,369, dated Jan. 7, 2022 through Dec. 30, 2022, 29 pp.

Written Opinion and International Search Report dated Jul. 9, 2020 received in counterpart International Application No. PCT/IB2019/051233, 16 pp.

Zhu et al., "Virtualization of 5G Cellular Networks as a Hierarchical Combinatorial Auction," arXiv:1511.08256v1, IEEE Transactions on Mobile Computing, Nov. 26, 2015, 16 pp.

* cited by examiner

SYSTEM AND METHOD FOR A RAN EXCHANGE

This application is a continuation of U.S. patent application Ser. No. 17/301,369, filed 31 Mar. 2021, which is a continuation of U.S. patent application Ser. No. 15/898,401, filed 16 Feb. 2018; the entire content of each application is incorporated herein by reference.

BACKGROUND

Field of Invention

The present invention relates to 4G and beyond for short-term, programmable Radio Access Network (RAN) and LTE spectrum sharing among a plurality of mobile operators or virtual operators applying programmable network principles.

Discussion of Related Art

Sharing of the Radio Access Network (RAN), also known as RAN-sharing was an idea originally proposed by operators to aid shortage of funds for investment into network infrastructure caused by extremely high license fees. The RAN-sharing is viewed as a mechanism to shorten the network deployment period while greatly reducing operation costs. It was initially attractive mostly to small and medium mobile operators, but now it has been widely implemented bi-laterally between many large mobile operators in Europe and US as well. Regulatory coverage requirement of 60-98% for many European countries has also forced them to participate in RAN-sharing. Furthermore, it created a new market for wholesalers building LTE RAN infrastructure at rural locations and retailing it to other operators that can't economically justify the build out.

In RAN-sharing, the sharing operators keep their own core network infrastructure, and services. They also have independent provisioning and billing systems. They only share the radio access network, meaning the shared RAN (base station(s)) is connected to the core network of multiple operators. In doing so, they effectively save time and cost in finding an appropriate site, in the physical deployment of the site, and equipping it with transmission facilities and radio equipment.

Even if two operators decide to deploy exactly the same service, the service parameter setting may be different. So, how to deploy a service with varied radio performance on a shared physical device presents a considerable challenge to any operator. While RAN-sharing was happening in an ad-hoc way, the standards group 3GPP developed two key standards: TR 22.951 V8.1.0 (service aspects and requirements for network sharing) and TR23.251 V8.1.0 (network sharing architecture and functional description) that define two options for RAN-sharing: Multiple Operator Core Networks (MOCN) and Gateway Core Network (GWCN). These options describe clearly how to provide traffic separation in a shared RAN to achieve RAN-sharing between many operators.

LTE provides a better infrastructure than older radio technologies for RAN-sharing primarily because the standards are built to allow a sliceable RAN infrastructure—although slicing has not yet been a published standard. Furthermore, because LTE is IP protocol based, it is much more flexible in routing traffic in different ways. Another aspect that drives the sharing is that LTE RAN is far more expensive than the older RAN technologies.

RAN-sharing offers an extremely attractive value combination for operators, but there are key problems to be considered and solved in terms of operation and maintenance: (a) the current model is typically based on bi-lateral agreements between operators and for prolonged time periods (e.g., 10 years), which puts them into an obligation for a long time period, (b) if the requirements (capacity, QoS, service level agreement (SLA) requirements etc.) change there is no flexibility in the sharing arrangement which is sealed through a contract, (c) because the process of configuring the services onto the RAN for each operator on a manual basis, it is not flexible enough to meet changing traffic needs.

A RAN is comprised of a number of base stations (also known as eNodeB) that is normally configured to connect to a core network (CN) of a mobile operator upstream from the base stations, but it may also be configured to connect to a plurality of core networks wherein each core network belongs to a different mobile operator. Doing so, the user equipment (UE) such as a smart phone, tablet or PC can access the plurality of mobile operators network via the shared RAN. The term upstream or uplink indicates the communication direction from the UE towards the core network, whereas the term downstream or downlink indicates from the core network towards the UE. The base station comprises a radio transmission and/or reception unit, one or more antennas and a base station controller (BSC), all configured to establish communication over a radio interface with the UEs.

Using the Multi Operator Core Network (MOCN), an approach defined by 3GPP, the shared base station simultaneously broadcasts a plurality of public land mobile network identifier (PLMN IDs) to the UE, each PLMN ID being associated with an operator's network sharing that base station. When the UE attempts to attach the base station with one of these PLMN IDs, the shared-RAN completes the UE attach procedure by sending the request towards the Mobility Management Entity (MME) of the core network that belongs to the operator with that PLMN ID. The UE attach procedure is well known in prior art and hence will not be detailed here.

3GPP recently defined capabilities of an API for service capability exposure function (SCEF) in TR 23.708 to allow mobile operators to securely expose capabilities for sharing resources. It allows operators to interact with 3rd party service providers in exposing a greater set of 3GPP service capabilities as requested by 3rd parties using a standardized framework. However, this document does not specify how the sharing will be achieved.

Braun et. al. in EP2477427 A1 describes a method for multi-operator charging when a RAN is shared. It describes the usage information measured from a base station such as radio resource block usage, uplink and downlink data throughput, and transmission power usage per UE attached to a base station as possible components of usage and billing. However, Braun et. al. assumes a RAN-sharing is prearranged. It does not describe a system for advertising and brokering excess RAN capacity and a short time leasing mechanism.

Middleton et. al. in US20140359092 A1 describes a capacity exchange platform for Open Content Delivery Network (CDN) wherein capacity refers to the ability of a particular CDN partner to deliver content on behalf of a content originator or content publisher. Capacity is determined from the availability of disparate resources and disparate service attributes related to those resources. Resources that comprise a measure of capacity including processor cycles, memory, bandwidth, throughput, and services (e.g., caching of static content, caching of dynamic content, application services, media streaming, secure content delivery, etc.). These specific service attributes qualify the application of capacity and may include identifying a geographic region that the capacity covers, identifying the time of day that the capacity is available, identifying the duration for the availability of capacity, and identifying the one or more points of presence (POPs). Although the system of Middleton et. al. has the similar goal as the RANxChange in principle to advertise, broker and share excess capacity, the underlying resource definitions and the systems needed to operate it are technologically very different than RANxChange.

Gogic et. al. in US20140029529 A1 teaches methods and systems for allocating resources for RAN-sharing. A method generally includes maintaining a breakdown of RAN resources committed to each of the sharing partners, assessing how to distribute the overall spare capacity of the RAN resources, and allocating the RAN resources in accordance with the assessments and the relationship. It admits additional radio bearer corresponding to a partner if an assessed resource requirement of the radio bearer does not exceed the overall spare capacity of the RAN resources and an excess capacity of the RAN resources committed to another partner. It also describes how to admit specific traffic types to use the spare capacity. However, Gogic et. al. does teach a system and business model on how to broker and distribute RAN capacity between various contending operators.

Programmable networks and specifically Software Defined Networking (SDN) concepts are broadly applicable to transport services such as switching and routing as well as physical and MAC layers. SDN in networking means a control plane that is decoupled from the data plane of forwarding functions and assigned to a logically centralized controller, which is the 'brain' of the network. The SDN architecture, with its software programmability, provides agile and automated network configuration and traffic management that is vendor neutral and based on open standards. Network operators, exploiting the programmability of the SDN architecture, are able to dynamically adjust the network's flows to meet the changing needs while optimizing the network resource usage. The controller is the central control point of an SDN and hence vital in the proper operations of network switches.

Programmable RAN (ProgRAN) is a prior art concept that relies on principles of SDN for remotely configuring base stations with different configurations for different traffic flows, i.e., achieving 'slicing' of a base station. The key concepts of ProgRAN and RAN slicing essentially allow groups of users or applications to be treated differently by employing a different 'configuration file' per user group within the base station. The uplink/downlink resource utilization and the scheduler components can be individually programmed for each user group. Just like RAN slicing principles being applicable to different user groups of an operator, it is also applicable to the case of users of different mobile operators. The brain of RAN slicing is the 'RAN Slice Controller' which can program one or more base stations according to user group or application profiles.

A slice is an optimized virtual network created by the mobile network operator (MNO) for a specific market scenario with specific requirements. It aims to realize some of the expected benefits of virtualization by providing a model for operationalizing a virtualized and programmable cloud-based network infrastructure. A slice is fundamentally composed of all necessary network assets, or resources, as well as network functions to control these assets. Optionally, a slice may include additional functions to control various aspects of the network. Slice orchestration and control are necessary to design network slices, determine their activity geography, and programmatically map user and/or flows to a given network slice. SDN keeps the network control in a logically centralized controller. As such, it provides an abstraction of the entire physical network infrastructure.

SUMMARY

When a RAN is shared, the usage of eNodeB resources must be obtained and stored for proper reporting. The usage resources attributed to the communications of a UE, are
  (a) the number of LTE resource blocks (using a time-frequency grid) used up;
  (b) the data throughput (or bandwidth) used on the link between the UE and the base station that can be estimated from the number of IP packets or bytes transmitted on the uplink and/or downlink of the communication;
  (c) transmission power level used up by the base station for the specific UE communications.

In one embodiment, the usage may be estimated using a combination of above three parameters.

These usage parameters can be obtained either using the Element Management System (EMS) of the eNodeB or it can also be measured from the S1-U interface between the eNodeB and MME, wherein the communications with a specific UE is tracked. Both methods are known in prior art.

Instead of looking at a RAN as a collection of independent base stations, the 'programmable RAN' paradigm argues that all base stations deployed in a geographical area can be abstracted as a virtual big-base station which is made up of distributed radio elements (i.e., the individual physical base stations). Instead of assuming that each base station has its own set of resources, programmable RAN (a) assumes that all neighboring base stations are allocating from a fixed set of shared radio resources which form a three dimensional grid of space, time, and frequency slots; and (b) program them in a software defined fashion (as in an SDN) through a logically centralized radio access network (RAN) Slice Controller. With a control channel between each base station and the controller, base stations provide updated global view of the network to the controller, and allow the controller to communicate radio resource management decisions back to the base stations.

RAN Slice Controller allocates a group of resource blocks to each radio subscriber/subscriber group. LTE uses OFDMA, where radio resources are split into time and frequency slots, called 'resource blocks'. The channel quality and the interference for each subscriber can vary across these resource blocks; hence, they must be smartly shuffled between the contending subscribers. It also assigns transmit power values to each resource block at each base station while conforming to overall transmit power constraints. This major shift from the notion of a fixed base station configuration to a programmable configuration allows a much more efficient utilization of wireless network resources and instant reconfiguration to meet the needs of end devices.

The system and method of this invention allow: (a) use the programmability of each operator's RAN into different slices according to Sunay, U.S. Pat. No. 9,680,958 B2 (System and Method for Programmable Radio Access Networks), (b) sharing of RAN slices on a short-term lease with a plurality of members of the system of invention, (c)

pooling of the RAN capacity from a large number of mobile operators, and (c) fair bidding of the price for each RAN slice.

Embodiments of the present invention are an improvement over prior art systems and methods.

This disclosure is about a Radio Access Network (RAN) capacity exchange (so called RANxChange), a system and method, through which the mobile operators can advertise slices/partitions of available unused base station capacity, and auction and lease it. A member of RANxChange is a mobile operator, a virtual mobile operator, a private wireless network operator or even an application provider. A member-operator can advertise their unused base station capacity availability or lease capacity from another member-operator for a specific time period. The platform provides several advantages to member operators: (1) to scale capacity through leasing without incurring capital expenditure for the lessee, (2) to acquire healthy revenues from unused radio access resources that otherwise sit idle for the lessor, (3) avoid risks associated with base station installations at locations of uncertainty of user growth (such as rural areas), (4) through fair bidding, obtain best pricing. The RANxChange platform is securely connected to each member operator's 'RAN slice controller' over the public Internet or a private network with an open Application Programming Interface (API), defined per this embodiment, to send directives to slice/partition the base station radio resource between operators using principles of programmable RAN. Each available RAN capacity slice is advertised using attributes of (a) advertising operator, (b) leasing operator, (b) base-station location, (b) time-frame of availability, (c) time-frequency resource blocks (from the operator's own spectrum or a pooled spectrum), and (d) total uplink and downlink data throughput and QoS. Aforementioned API further allows each lessee to send their configuration files for their temporary slice to the RAN slice controller of the lessor, which in turn applies to the base station. These configuration files can be sent at the onset of the completion of the auctioning process for activation at the future start time, or right before the start time of the slice. Furthermore, the RANxChange collects performance data from each leased RAN slice and reports to the lessee.

The bidding operators can bid for the full auctioned capacity or portion of the auctioned capacity. The users start attaching the leased slice transparently without any configuration changes on their mobile devices.

In one embodiment, the present invention provides a method comprising: (a) determining unused base station capacity of at least one base station owned by at least one mobile operator; (b) slicing determined unused base station capacity of the at least one base station determined in (a) into one or more slices; (c) advertising at least one slice in the one or more slices of unused base station capacity with an associated set of attributes for a short-term lease; (d) blocking use of the advertised at least one slice after the advertising step (c) by sending a directive for the blocking to the at least one base station; and (e) receiving instructions to remotely configure the advertised at least one slice upon successful completion of an auctioning process where a lessee winning the auctioning process leases the at least one slice on a short-term basis.

In another embodiment, the present invention provides a system allowing partitioning of unused capacity of a plurality of base stations owned by a plurality of mobile operators, and a plurality of lessee leasing partitions on a short-term basis, the system comprising: (a) a Web-based interface for communication with: (i) at least one mobile operator owning a base station capacity, the Web-based interface enabling the at least one mobile operator to become a member and advertise their partition of unused base station capacity with an associated set of attributes for a short-term lease; (ii) at least one lessee interested in leasing unused base station capacity, the Web-based interface enabling the at least one lessee to become another member and lease an available unused base station capacity partition. (b) a slice activator to remotely send directives to Radio Access Network (RAN) slice controllers of mobile operators for blocking, activating and configuring partitions for leasing; (c) a billing/charging engine allowing auctioning between multiple lessees and charging of a given lessee for a given leased slice, the billing/charging engine connecting to a payment gateway for transaction handling; and (d) a default local RAN slice controller receiving instructions from the slice activator and directly controlling base stations of those member mobile operators without a local RAN Slice Controller, and sending directives to RAN Slice Controllers of member mobile operators with local RAN Slice Controller for controlling their respective base stations.

In yet another embodiment, the present invention provides a method for a first Radio Access Network (RAN) slice controller associated with a first mobile operator to interface with a second RAN slice controller of a second mobile operator using an API, the method comprising the steps of: (a) authenticating and authorizing communications over the API between the first RAN controller and the second RAN controller; (b) sending a second operator's configuration file to configure a specific slice on a base station associated with the first mobile operator for usage by the second mobile operator; and (c) sending a directive to activate or deactivate usage of the specific slice by the second operator.

In yet another embodiment, the present invention provides a method for an external system interfacing with first Radio Access Network (RAN) slice controller associated with a first mobile operator and with a second RAN slice controller of a second mobile operator using an API, the method comprising the steps of: (a) authenticating and authorizing communications over the API between the external system and the first RAN slice controller, and between the external system and the second RAN slice controller; (b) the first RAN slice controller reporting available slice capacity to said external system allowing partitioning of unused capacity of a plurality of base stations owned by the first mobile operator, and a plurality of lessee leasing reported partitions on a short-term basis; (c) receiving from the external system a directive to block usage of the slice capacity; (d) sending a second operator's configuration file to configure a specific slice on a base station associated with the first mobile operator for usage by the second mobile operator; (e) sending a directive to the first mobile operator to activate or deactivate usage of the specific slice by the second mobile operator; and (f) sending a directive to first operator to report usage of the specific slice by users associated with the second mobile operator.

In yet another embodiment, the present invention provides a method for a first Radio Access Network (RAN) slice controller associated with an external system interfacing directly with a first operator's base station using an API, the method comprising the steps of: (a) authenticating and authorizing communications over the API between the the first RAN slice controller and the base station; (b) receiving from the external system a directive to block a slice capacity's usage on the first operator's base station; (c) sending a second operator's configuration file to configure a specific slice on a base station associated with the first mobile operator's base station for usage by the second mobile operator; (d) sending a directive to the first mobile operator's base station to activate or deactivate usage of the specific slice by the second mobile operator; and (e) sending a directive to first operator's base station to report usage of the specific slice by users associated with the second mobile operator.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION

Figure 1:
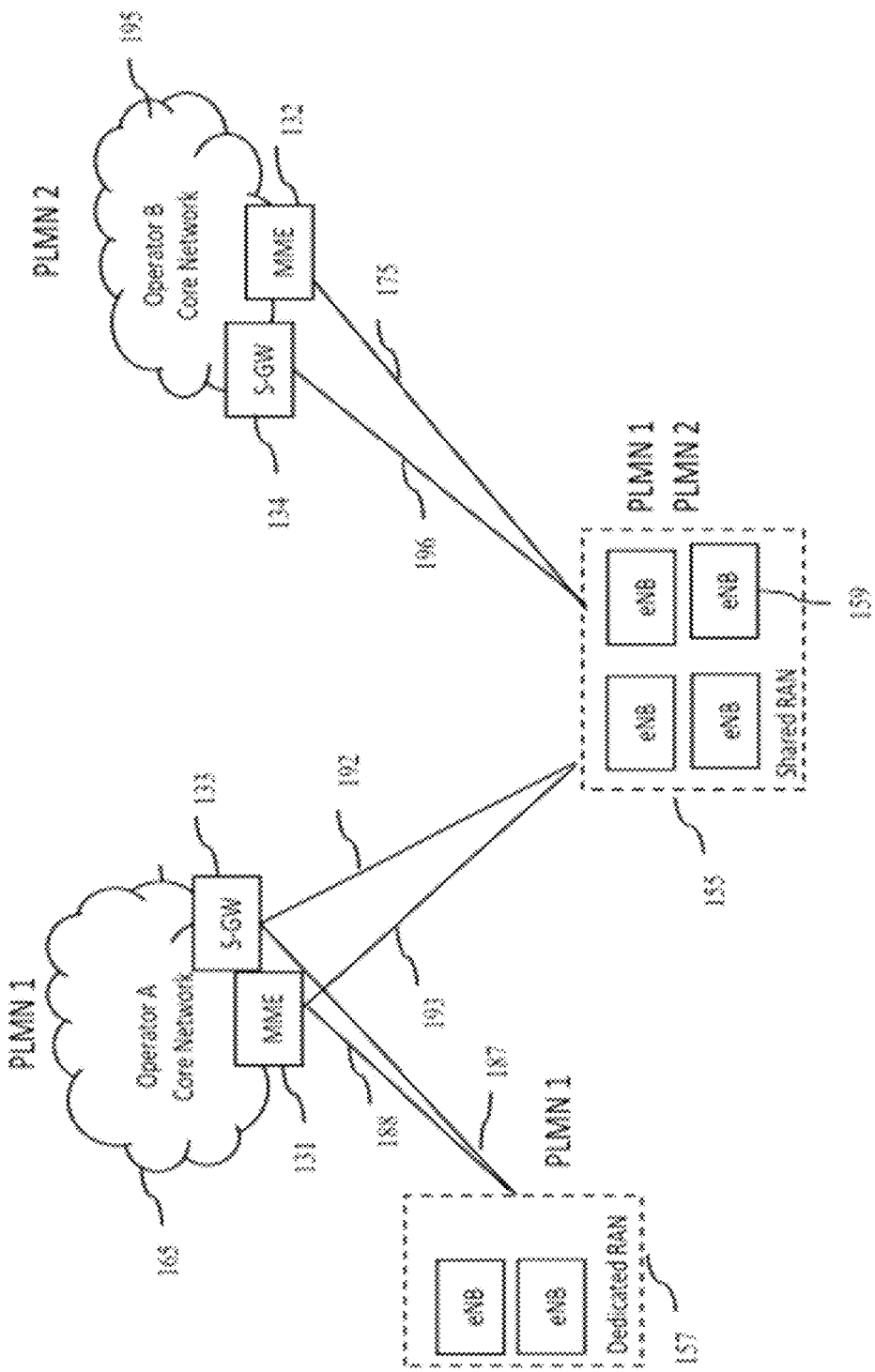
FIG. 1 illustrates a RAN sharing between two operators according to prior art.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

An electronic device (e.g., base station, agent or controller) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals-such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware. As used herein, a network device is a piece of networking equipment, including hardware and software that communicatively interconnects other equipment on the network (e.g., other network devices, end systems). A network device is generally identified by its media access (MAC) address, Internet protocol (IP) address/subnet, network sockets/ports, and/or upper OSI layer identifiers.

A Radio Access Network (RAN) is comprised of one or more base stations. A base station provides cellular connection of user equipment (UE) to a mobile operator's core network. The base station is connected to an antenna (or multiple antennas) that receives and transmits the signals in the cellular network to cellular phones and other cellular devices (known as UE). The RAN is connected to mobile operator's Core Network (CN) to transmit data end to end.

Unless specified otherwise, the embodiments of the invention apply to any RAN Slice Controller of the layered network architecture, i.e., they are NOT limited to an SDN type controller or ProgRAN of prior art. Although the RAN Slice Controller is shown to have remote communications with all base stations, it is possible to implement it on one of the base station's hardware.

Note while the illustrated examples in the specification discuss mainly a programmable radio access network (RAN) relying on the SDN paradigm of having a separate controller(s) to manage network resources in communications with a group of base stations, embodiments of the invention may also be implemented in other types of software defined radio networks. It can be implemented in any layered network architecture wherein there is a control infrastructure separated from wireless data transmission that can be instructed to change the allocation of resources to wireless end devices. Unless specified otherwise, the embodiments of the invention apply to any programmable or software defined RAN slice controller.

FIG. 1 illustrates Operator A and B sharing a RAN. 3GPP specifications 22.951 and 23.251 describe the network sharing requirements and architecture. The main feature that allows network sharing in LTE is the ability of the eNodeB (one of the base stations in the RAN) to broadcast multiple PLMN IDs towards the UE during the attachment process. Each operator has a unique Public Land Mobile Network (PLMN) ID, which is combination of Mobile Country Code and Mobile Network Code. The UE is expected to select the PLMN ID based on its programmed selection process. The eNodeB in turn uses this PLMN ID to select the operator Core Network to connect to. This method of eNodeB serving multiple operators is called Multi Operator Core Network (MOCN).

In FIG. 1 Operator A's core network 165 exposes Mobility Management Entity (MME) 131 and Serving Gateway (S-GW) 133 towards the eNodeB of the shared RAN 155, which is comprised of at least one eNodeB 159. The interfaces between an eNodeB and various components of the Core Network are well defined in 3GPP standards, and thus in prior art. Similarly, Operator B's core network 195 exposes MME 132 and S-GW 134 towards shared RAN 155. Note that, Operator A has PLMN 1 and Operator B has PLMN 2. Therefore, eNodeB 159 in shared RAN 155 must broadcast both PLMN 1 and 2. The control traffic of UEs that attach to Operator A are routed towards Operator A's MME 131 and data traffic towards S-GW 133. Similarly, the control traffic of UEs that attach to Operator B are routed towards Operator B's MME 132 and data traffic towards S-GW 134. Operator A may also have dedicated RAN 157, to which only UEs of Operator A are attached, but attached to the same MME 131 and S-GW 133. Meaning MME and S-GW are shared across dedicated and shared RAN components.

RAN sharing as depicted in FIG. 1 is based on contractual arrangements for resource sharing between different Operators. A more powerful approach is to perform RAN sharing using the 'slicing' approach of a programmable RAN. Instead of assuming that each base station has a fixed set of resources allocated to different Operators, in programmable RAN, each eNodeB can be reprogrammed through a logically centralized RAN Slice Controller such that resources are reallocated on-demand and in real-time. With a control channel between each eNodeB and the RAN Slice Controller, base stations can provide their most recent updated global view of resource usage, and allow the controller to communicate radio resource management decisions back to the eNodeB.

Figure 2:
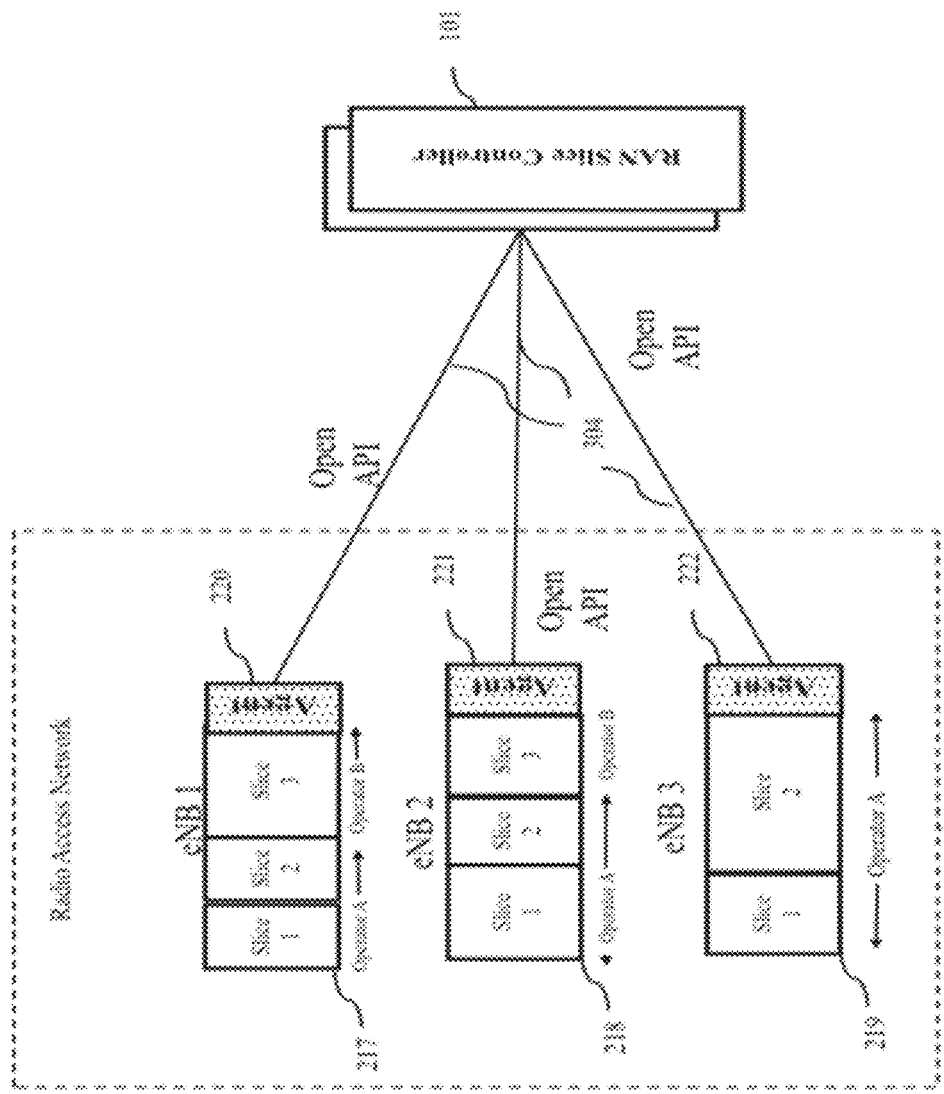
FIG. 2 illustrates base station slicing using a RAN slice controller according to prior art.

FIG. 2 illustrates a simple exemplary network with a RAN comprised of eNodeB 1, eNodeB 2 and eNodeB 3, numbered 217, 218 and 219, respectively. Each eNodeB has an 'Agent' component, 220, 221, and 222, in communications with centralized RAN Slice Controller 101. The interface 304 between RAN Agents 220, 221, and RAN Slice Controller 101 is an Open API.

In one embodiment, the Open API on interface 304 is a Representational State Transfer (REST) API, which allows sending an HTTP/HTTPS GET message using the other end point's IP address. That message would contain a URI string referencing the relevant network end point and comprising an HTTP payload with a JSON (JavaScript Object Notation) header that has the proper parameters for a particular interface and statistic. As a quick background, JSON is used in Javascript on the Internet as an alternative to XML for organizing data. Just like XML, JSON is language-independent and may be combined with C++, Java, Python, Lisp and many other languages. Unlike XML, however, JSON is simply a way to represent data structures, as opposed to a full markup language. JSON consists of "name: object" pairs and punctuation in the form of brackets, parentheses, semi-colons and colons. Each object is defined with an operator like "text:" or "image:" and then grouped with a value for that operator.

A high-level two-way messaging can be defined between Agents 220, 221, 222 and RAN Slice controller 101. This interface is used to manage the profile database within RAN Slice Controller 101. "RB (Resource Block) Rate", "Scheduler Type" and "IMSI list" are a few of the profile attributes to be used for the scheduling of resources of the eNodeB. Exemplary messages on the interface can be broadly grouped in the following categories:

Session Setup Messages-INIT, INIT_ACK
Link Maintenance Messages-ECHO_REQ, ECHO_RSP.
Event Reporting Messages-EVENT RPT
Configuration Messages-CFG_SET_REQ, CFG_SET_RSP.
Statistics Reporting Messages-STATS_REQ, STATS_RSP As illustrated in FIG. 2, each eNodeB can be sliced differently. While eNodeB 217 and 218 are sliced into three different slices with each slice having a different profile defining different resource usage, eNodeB 219 has only two slices. One can conceive slices as allocated to the same or different operators as illustrated in the Figure. If a slice is allocated to a different operator, then associated provisioning file of that Operator defining how services are delivered must also be downloaded onto the eNodeB. An exemplary profile of a slice is defined by (a) uplink and downlink usage percentages in bit per second, (b) the number of resource blocks usable, and (c) the MAC scheduler type usable.

A 'resource block' for LTE is defined in prior art as the smallest unit of resources that can be allocated to a user. The resource block is 180 kHz wide in frequency and 1 slot long in time. In frequency, resource blocks are either 12×15 kHz subcarriers or 24×7.5 kHz subcarriers wide. The number of subcarriers used per resource block for most channels and signals is 12 subcarriers. Although the term 'resource block' is used for LTE, other resource representations may be used in 5G and beyond, and should be considered covered by this embodiment. A 'MAC Scheduler' (or scheduler in short) within the eNodeB determines how the downlink and uplink channels are used. The scheduler assigns these resources in such a way as to satisfy QoS requirements and optimize system performance.

Figure 3:
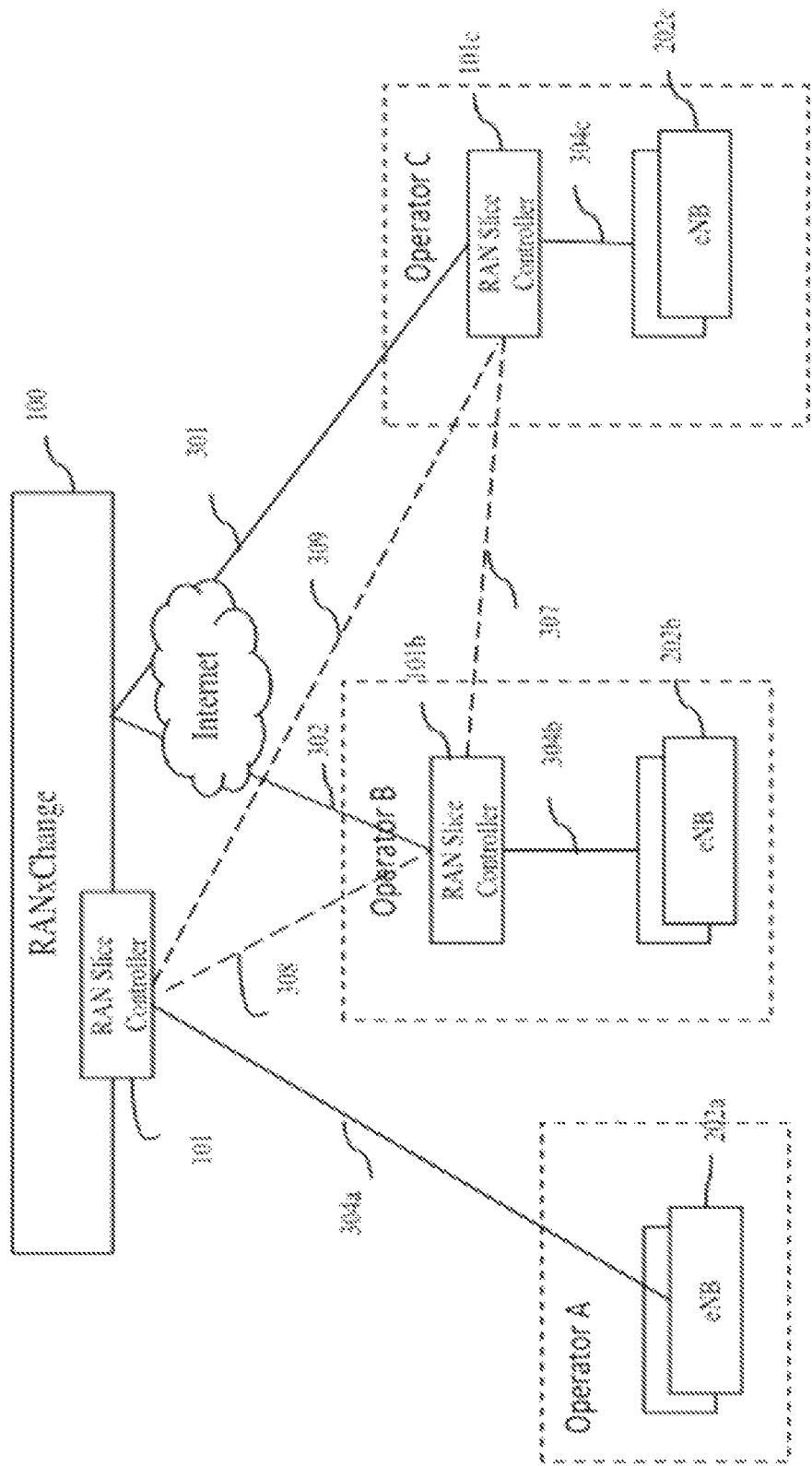
FIG. 3 illustrates an embodiment of the invention with RANxChange.

FIG. 3 illustrates an embodiment of the invention. Operators A, B and C are members of RANxChange sharing their RAN capacity. Operator B has a local RAN Slice Controller 101b, and Operator C has a local RAN Slice Controller 101c, while Operator A does not have a local RAN Slice Controller, but relies on the RAN Slice Controller 101 co-located with of RANxChange 100 (i.e., local). RAN Slice Controllers 101, 101b and 101c are also interconnected to exchange configuration messages. There are three key interfaces:

API 1: Per this invention, a RAN Slice Controller to RAN Slice Controller interface shown as 307, 308 and 309. This interface is used for a RAN Slice Controller to securely communicate with another RAN Slice Controller. This API is multi functional.

API 2: Per this invention, RANxChange to RAN Slice Controller interface shown as 301 and 302. This interface is used for the RANxChange and RAN Slice Controller to securely communicate. For example, it allows RAN Slice Controller (i) to send notifications on available slice capacity automatically preventing manual intervention, and (ii) report slice usage after the lease period starts. In turn, RANxChange can send messages to RAN Slice Controller (i) to block a particular slice resource if a bid is accepted, and (ii) to claim a slice resource at the start time of the lease.

API 3: RAN Slice Controller to eNodeB (Agent) interface shown as 304a, 304b and 304c. This interface is used for configuring the eNodeBs. ProgRAN is an embodiment of this interface in prior art, and its functionality is covered in Sunay, U.S. Pat. No. 9,680,958 B2 (System and Method for Programmable Radio Access Networks).

The secure connections amongst RAN Slice Controllers, and between each RAN Slice Controller and the RANxChange can be secure TCP/IP tunnels over the public Internet or on an MPLS network, or it can simply be over private lines. An authentication and authorization step will be needed before conducting any message exchange if it is a connection over a public network.

Figure 4:
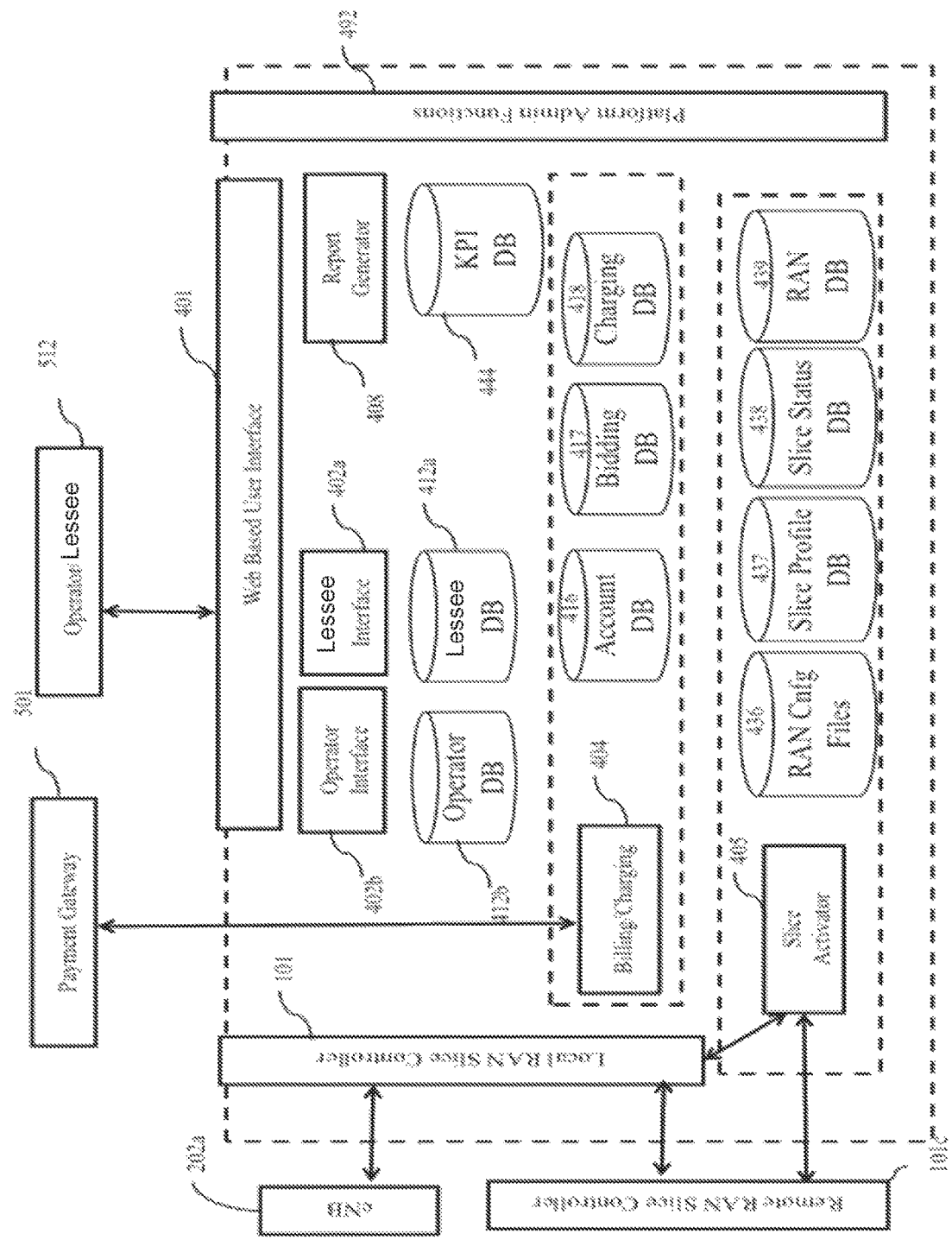
FIG. 4 illustrates the components of RANxChange per this invention.

An embodiment of RANxChange 100 is shown in FIG. 4. RANxChange is a software application that runs on a single computer or many computers for load sharing. There are several key components:

- Web based user interface 401 allows members of RANxChange to interact with the platform performing key functions such as (a) entering their member profiles and accounting information through Operator Interface 402b, DB 412b and Lessee Interface 402a, DB 412a, (b) entering and/or seeing available RAN slices by geographic location, by mobile operator and by slice attributes (including leasing time, capacity and QoS), (c) performing bidding on a slice and completing a leasing transaction including charging, and (d) obtaining usage reports on a leased slice.
- Slice Activator 405 is the key function of the platform as it interacts with all remote RAN Slice Controllers 101c of member operators to send and receive messages regarding the status and usage of RAN slices, as well as with the local RAN Slice Controller 101. It is tied into RAN Configuration Files DB 436 to store the configuration files of each operator for different slices. Slice Profile DB 437 stores all attributes of slices. Slice Status DB 438 stores the status of each slice (available, reserved, claimed, active, completed, failed, overused, etc.) RAN DB 439 stores information on each mobile operators RAN components including geographic coordinates, street address, IP address, security information, etc.
- Billing/Charging 404 is the function of performing brokerage between each member lessor and lease. It is attached to Payment gateway 501 for monetary transactions. In support of Billing/Charging 404, there are several databases: Accounting DB 416 stores each platform user's accounting information. Bidding DB 417 stores the results of an active bidding process. Charging DB 418 stores the slice tariffs and final prices of platform members. Using web based UI 401, Billing/Charging 404 tracks all financial transactions of listing slice prices/tariffs, completions of the bidding process, and finally the charging members by engaging the payment gateway for the final financial transaction. Billing/Charging 404 is designed in a flexible way to allow different financial models due to conducting brokering.
- Report Generation 408 and associated Key Performance Indicators DB 444 performs slice usage monitoring during a lease. The usage and performance data is reported to the lessee and the lessor.
- Platform Admin Interface 492 is used to manage the platform.

In an embodiment of the system of the invention, the slice 'capacity availability notice period' is customizable. The availability can be provided, for example, on a longer time period basis (e.g., monthly aggregate) for each base station in a specific geographic area, in which case the notice period must be at least a month-ahead. On-demand availability is supported such as 'day-ahead' or 'day-of'. In addition, availability for special days can also be announced day-ahead or month-ahead. The system supports several such realistic notice period scenarios. The user interface of the system enables configuration of notice periods.

The simplest slice pricing can be based on a published 'tariff' wherein each slice is listed by slice location, slice capacity, and slice QoS, and priced accordingly. For example, a slice in crowded metropolitan area might be more expensive than the same slice in a sparsely populated rural area. Even though such a tariff is published, the lessee should be allowed to bid higher than the tariff if there is more than one lessee interested in obtaining the slice. The web based user interface allows the lessee to see other bids and over-bid, if interested. The final slice price can be determined either (i) on a scheduled basis (e.g., 12 hours after slice capacity announcement) or (ii) by the lessor Operator after an Operator-customized time period expires. Both options are supported. Furthermore, there is a penalty of shortfall of delivery defined for each slice in case the operator fails to deliver the promised capacity. The amount corresponding to the penalty can also be customized.

Payment transaction between the lessee and lessor is performed only through the system. The brokering fee is deducted from each transaction, and the remainder is deposited into the lessor's account. Such transaction is enabled a secure connection to a payment gateway.

Figure 5:
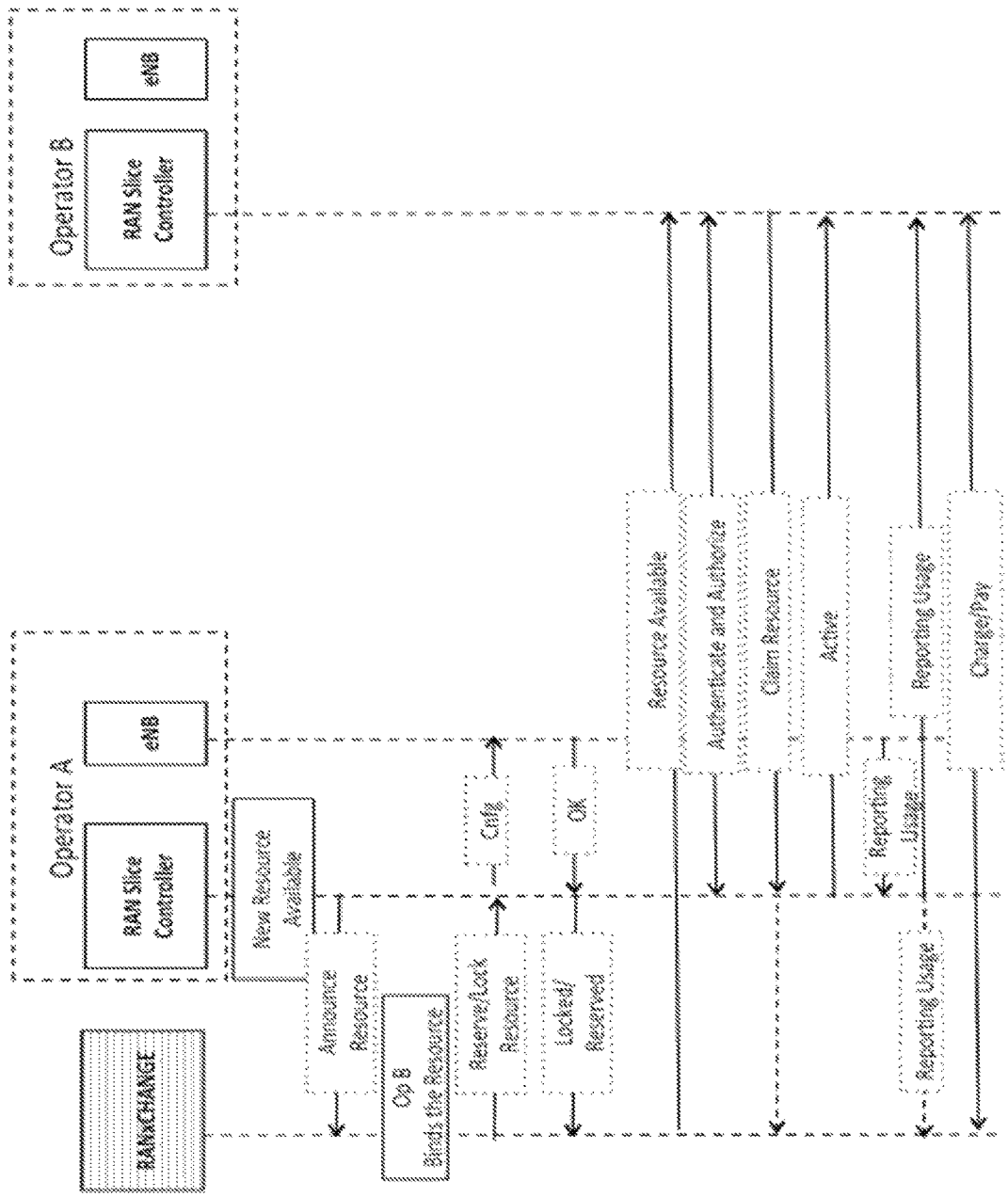
FIG. 5 illustrates an exemplary sequence of interactions between the lessor and lessee using local RAN slice controllers per this invention.
Figure 6:
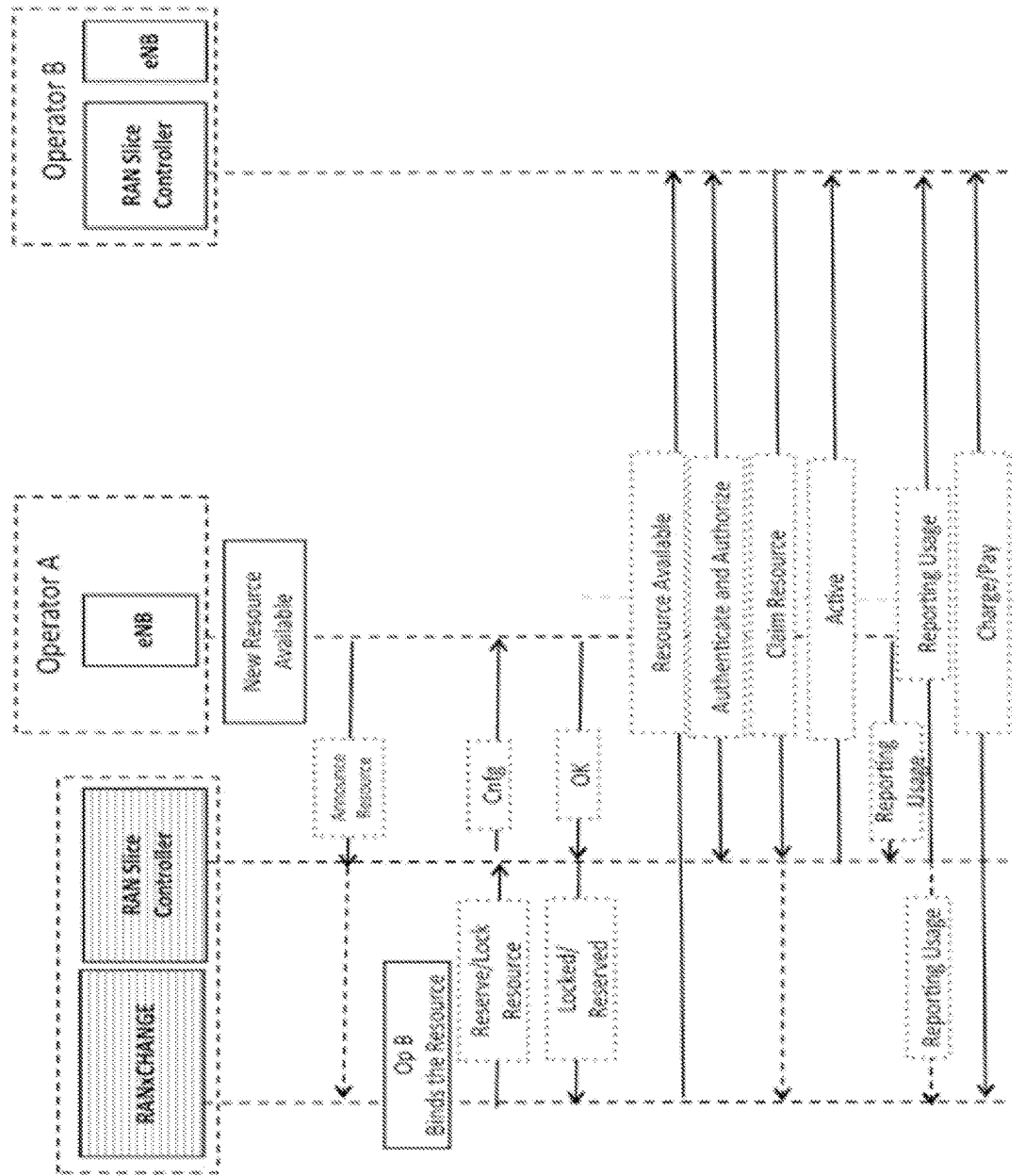
FIG. 6 illustrates an exemplary sequence of interactions between the lessor and lessee using a centralized RAN slice controller per this invention.

FIG. 5 and FIG. 6 show the basic steps of Operator B leasing a slice offered by Operator A. In FIG. 5, both Operator A and B have local RAN Slice Controllers. In FIG. 6, Operator A does not have a RAN Slice Controller, and hence the RAN Slice Controller of RANxChange acts as the RAN Slice Controller of Operator A.

When a new slice becomes available, it is stored in the RANxChange by the slice-owner mobile operator (Operator A) either manually or through that operator's RAN Slice Controller electronically. A slice changes many states as the brokering process is about to be conducted. The initial state of a slice is 'available'. When the RANxChange registers it in its database, it changes it's state as 'locked' after it sends a message to the RAN Slice Controller A to block its usage and the RAN Slice Controller successfully locks it from any usage. The locking requires RAN Slice Controller A to communicate with eNodeB A. During the bidding process, the slice resource stays available and locked. After Operator B obtains the slice through a successful bidding process, RANxChange sends a message to RAN Slice Controller B that the slice resource is 'available at the start time of the lease'. This message contains attachment information of Operator A's RAN Slice Controller. Either the start time of the lease or after the slice resource changes state to available, RAN Slice Controller B sends a message to RAN Slice Controller A to claim the slice. This message contains the lessee's configuration file to configure the slice. The state of the slice is changed to 'in-use' at the start time of the slice. If the process of configuring the slice does not succeed, the state of the slice is changed to 'provisioning-failed'. There may be other states of the slice such as 'overused' or 'underused', etc.

There are four key stages of a slice's lifetime:
- Resource Announcement: Initial slice resource announcement by the lessor. The slice data is in RANxChange database.
- Resource Locking/Blocking: The RANxChange checks that the slice resource is indeed available and blocks it's use until the auctioning and leasing financial transaction are completed.
- Resource Activation/Claiming: Once a lease transaction is finalized, the slice is activated at the start time of the slice.

Resource Usage Monitoring: Once the slice is in use, the usage monitoring starts.

Many of the above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor. By way of example, and not limitation, such non-transitory computer-readable media can include flash memory, RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. The computer readable media does not include carrier waves and electronic signals passing wirelessly or over wired connections.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

CONCLUSION

A system and method has been shown in the above embodiments for the effective implementation of a system and method for a RAN exchange. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

What is claimed is:

1. A Radio Access Network (RAN) capacity exchange system comprising a processor and a storage device, wherein the processor has access to the storage device and is configured to:
receive, from a first RAN slice controller that programs a plurality of base stations of the RAN, an indication of a RAN slice having unused capacity of the plurality of base stations of the RAN;
based on the indication of the RAN slice having unused capacity of the plurality of base stations of the RAN, direct the first RAN slice controller to block usage of the RAN slice;
set, in a database, based on receipt of an indication the first RAN slice controller has blocked usage of the RAN slice, a state of the RAN slice to locked to indicate the first RAN slice controller has blocked usage of the RAN slice; and
based on a determination to allow a mobile operator to claim the RAN slice, outputting, to a different, second RAN slice controller associated with the mobile operator, an indication the RAN slice can be claimed from the first RAN slice controller.

2. The system of claim 1, wherein the indication the RAN slice can be claimed from the first RAN slice controller comprises an indication the RAN slice can be claimed from the first RAN slice controller at one of:
a time the state of the RAN slice is to be changed to available; or
after the state of the RAN slice is changed to available.

3. The system of claim 1, wherein the processor is further configured to:
send, to the first RAN slice controller, a configuration file of the mobile operator to cause the first RAN slice controller to configure, according to the configuration file, the RAN slice on at least one of the plurality of base stations of the RAN for usage by the mobile operator.

4. The system of claim 3, wherein the configuration file determines resource usage by the RAN slice.

5. The system of claim 3, wherein the processor is further configured to:
receive the configuration file from the second RAN slice controller.

6. The system of claim 1, wherein the processor is further configured to:
authenticate and authorize communications over an application programming interface between the RAN capacity exchange system and the second RAN slice controller.

7. The system of claim 1, wherein the processor is further configured to:
send, to the first RAN slice controller, a directive to activate usage of the RAN slice.

8. The system of claim 1, wherein the processor is further configured to:
send, to the first RAN slice controller, a directive to deactivate usage of the RAN slice.

9. The system of claim 1, wherein the processor is further configured to:
output an indication of availability of the RAN slice to the second RAN slice controller.

10. The system of claim 9, wherein the processor is further configured to:
after output of the indication of availability of the RAN slice, receive a request from the second RAN slice controller to claim the RAN slice; and
determine, in response to the request, to allow the mobile operator associated with the second RAN slice controller to claim the RAN slice.

11. The system of claim 1, wherein the processor is further configured to:
monitor usage of the RAN slice; and
report monitored usage of the RAN slice to at least one of the mobile operator associated with the second RAN slice controller or another mobile operator associated with the first RAN slice controller.

12. Non-transitory machine-readable media storing software instructions to configure a processor of a Radio Access Network (RAN) capacity exchange system to:
receive, from a first RAN slice controller that programs a plurality of base stations of the RAN, an indication of a RAN slice having unused capacity of the plurality of base stations of the RAN;
based on the indication of the RAN slice having unused capacity of the plurality of base stations of the RAN, direct the first RAN slice controller to block usage of the RAN slice;
set, in a database, based on receiving an indication the first RAN slice controller has blocked usage of the RAN slice, a state of the RAN slice to locked to indicate the first RAN slice controller has blocked usage of the RAN slice; and
based on a determination to allow a mobile operator to claim the RAN slice, output, to a different, second RAN slice controller associated with the mobile operator, an indication the RAN slice can be claimed from the first RAN slice controller.

13. The media of claim 12, wherein the indication the RAN slice can be claimed from the first RAN slice controller comprises an indication the RAN slice can be claimed from the first RAN slice controller at one of:
a time the state of the RAN slice is to be changed to available; or
after the state of the RAN slice is changed to available.

14. The media of claim 12, wherein the software instruction are to configure the processor to perform operations comprising:
sending, to the first RAN slice controller, a configuration file of the mobile operator to cause the first RAN slice controller to configure, according to the configuration file, the RAN slice on at least one of the plurality of base stations of the RAN for usage by the mobile operator.

15. The media of claim 14, wherein the configuration file determines resource usage by the RAN slice.

16. The media of claim 14, wherein the software instructions are to configure the processor to perform operations comprising:
receiving the configuration file from the second RAN slice controller.

17. The media of claim 12, wherein the software instructions are to configure the processor to perform operations comprising:
authenticating and authorizing communications over an application programming interface between the RAN capacity exchange system and the second RAN slice controller.

18. The media of claim 12, wherein the software instructions are to configure the processor to perform operations comprising:
sending, to the first RAN slice controller, a directive to activate usage of the RAN slice.

19. The media of claim 12, wherein the software instructions are to configure the processor to perform operations comprising:
monitoring usage of the RAN slice; and
reporting monitored usage of the RAN slice to at least one of the mobile operator associated with the second RAN slice controller or another mobile operator associated with the first RAN slice controller.

20. A method comprising:
receiving, by a Radio Access Network (RAN) capacity exchange system, from a first RAN slice controller that programs a plurality of base stations of the RAN for a RAN, an indication of a RAN slice having unused capacity of the plurality of base stations of the RAN;
based on the indication of the RAN slice having unused capacity of the plurality of base stations of the RAN, directing, by the RAN capacity exchange system, the first RAN slice controller to block usage of the RAN slice;
setting, by the RAN capacity exchange system, in a database, based on receiving an indication the first RAN slice controller has blocked usage of the RAN slice, a state of the RAN slice to locked to indicate the first RAN slice controller has blocked usage of the RAN slice; and
based on determining to allow a mobile operator to claim the RAN slice, outputting, by the RAN capacity exchange system, to a different, second RAN slice controller associated with the mobile operator, an indication the RAN slice can be claimed from the first RAN slice controller.

* * * * *